3,174,969
19-SUBSTITUTED-5α-HALOGEN-6β:19-
OXIDO-PREGNANES
Albert Wettstein, Riehen, Georg Anner, Karl Heusler, and
Jaroslav Kalvoda, Basel, Hellmut Ueberwasser, Riehen,
and Jules Heer, Binningen, Switzerland, assignors to
Ciba Corporation, New York, N.Y., a corporation of
Delaware
No Drawing. Filed Sept. 7, 1962, Ser. No. 222,204
Claims priority, application Switzerland, July 15, 1960,
8,133/60; Oct. 28, 1960, 12,107/60; Dec. 23, 1960,
14,393/61; Apr. 5, 1961, 3,989/61; June 2, 1961,
6,479/61; June 13, 1961, 6,895/61; Sept. 18, 1961,
10,803/61; Jan. 9, 1962, 185/62
6 Claims. (Cl. 260—239.55)

This application is a continuation-in-part of our copending application Ser. No. 122,657, filed July 10, 1961, now abandoned, by Albert Wettstein et al.

The present invention relates to novel 3:19-dioxygenated 5α-halogen-6β:19-oxido-pregnanes, more especially to compounds of the formula

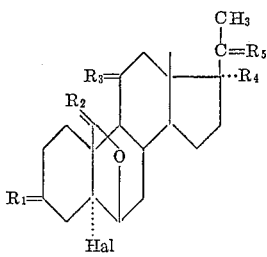

wherein $R_1$ and $R_2$ stands for oxo or hydrogen together with hydroxy or acyloxy, $R_3$ stands for hydrogen, oxo or hydrogen together with hydroxy or acyloxy, $R_4$ stands for hydrogen, hydroxy or acyloxy, $R_5$ stands for oxo or hydrogen together with hydroxy or acyloxy and Hal stands for a halogen with a molecular weight above 30, especially for chlorine and bromine.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenantic, decanoic, trifluoroacetic, carbonic-monomethylester or carbonic-monoethylester hexahydrobenzoic, cyclopentylpropionic, phenylpropionic, benzoic or furoic acid.

The compounds of the present invention are extremely useful intermediates for the production of 19-nor-pregnanes to which class of compounds belong several well known progestational agents such as 19-nor-progesterone, 17α-hydroxy-19-nor-progesterone and especially its esters, 6-dehydro-19-nor-progesterone etc.

The 19-nor-pregnenes are produced from the 3:19-dioxygenated 5α-halogen-6β: 19-oxido-pregnanes of the present invention by treating them with zinc and acetic acid at elevated temperature whereby Δ⁵-19-oxo-pregnenes or Δ⁵-pregnene-19-acids are formed. After converting the 3-substituent into a 3-oxo-group (e.g., by hydrolysis of a 3-acyloxy group and oxidation of a 3-hydroxy group formed) 19-oxygenated Δ⁴-3-ketones are obtained from which the angular C-19-substituent is eliminated in known manner.

Among the 19-oxygenated 5α-halogen-6β:19-oxido-pregnanes of the present invention the following are particularly important: 3β:11α:19-trihydroxy-5α-chloro-6β: 19-oxido-20-oxo-pregnane, 3β:11α:19:20-tetrahydroxy-5α-chloro- or 5α-bromo-6β:19-oxido-pregnane, the 19:6β-lactones of 3β:6β:11α:20β-tetrahydroxy-5α-chloro-pregnane-19-oic acid, of 3β:6β:20β-trihydroxy-5α-chloro-11-oxo-pregnane-19-oic acid, of 3β:6β:11β:20β-tetrahyroxy-5α-chloro-pregnane-19-oic acid, of 3β:6β:17α-trihydroxy-5α-chloro- or -5α-bromo-20-oxo-pregnane-19-oic acid and the corresponding compounds in which some or all of the free hydroxyl groups are acylated.

The above lactones are obtained from the corresponding 19-unsubstituted 6β:19-oxido-pregnanes by oxidation with chromium trioxide in acetic acid at a temperature of 60 to 80°. The 19-unsubstituted 6β:19-oxido-pregnanes are obtained either by treating a 5α-halogen-6β-hydroxy-pregnane with lead tetraacetate in boiling benzene or cyclohexane for several hours or by reacting a 5α-halogen-6β-hydroxy-pregnane in boiling cyclohexane solution with monovalent, positive iodine preferable in the presence of free iodine and strong visible light for 10 to 90 minutes. The monovalent positive iodine may be obtained from N-iodo-succinimide or from silver acetate and iodine or mercuric acetate and iodine. An especially efficient method for the preparation of the 5α-halogen-6β:19-oxido-pregnanes consists in treating a 5α-halogen-6β-hydroxy-pregnane in an apolar solvent, e.g., in boiling cyclohexane solution with lead tetraacetate and iodine. If 11-oxygenated (especially 11α-acyloxy)-5α-halogen-6β-hydroxy-pregnanes are treated with lead tetraacetate and iodine under the above defined conditions, 5α-halogen-6β:19-oxido-19-hydroxy-pregnanes are formed directly during the reaction. These may be oxidized to 19:6β-lactones with chromium trioxide in acetone-sulfuric acid at last temperature.

The following examples illustrate the invention. The temperatures are given in centigrade.

*Example 1*

(a) A suspension of 10 grams of calcium carbonate and 30 grams of lead tetraacetate in 1 liter of cyclohexane is heated to 80° C., treated with 8.0 grams of iodine and then with 5 grams of 3β:20β-diacetoxy-5α-chloro-6β-hydroxy-5α-pregnane and the reaction mixture is refluxed for 3 hours and then cooled and filtered. The residue is washed with ether, the filtrate extracted with sodium thiosulfate solution of 10% strength, dried and evaporated under reduced pressure, to yield 6.1 grams of a solid crude product which on crystallization from acetone+hexane yields pure 3β:20β - diacetoxy - 5α - chloro-6β:19-oxido-5α-pregnane melting at 148 to 150° C. Optional rotation [α]$_D$=+25° (in chloroform).

A solution of 4.0 grams of this compound in methanol is treated with 4.0 grams of potassium carbonate and water and refluxed for one hour, then evaporated in a water-jet vacuum and from the residue the crude 3β:20β - dihydroxy - 5α - chloro - 6β:19 - oxido - 5α - pregnane melting at 237 to 240° C. is isolated in the usual manner.

A mixture of 1.0 gram of the above compound, 50 cc. of pyridine and 2.2 grams of chromium trioxide is stirred for 20 hours at 60° C. and the reaction mixture is then worked up as usual. Recrystallization of the crystalline residue yields pure Δ⁴-3:20-dioxo-6β:19-oxido-pregnene (6β:19-oxido-progesterone) melting at 142–143° C. Optical rotation [α]$_D$=−18.8° (in chloroform).

(b) 1.0 gram of the 3β:20β - diacetoxy - 5α - chloro-6β:19-oxido-5α-pregnane described in part (a) is oxidized in 30 cc. of glacial acetic acid with addition of a solution of 1.5 grams of chromium trioxide in 1.5 cc. of water for 20 minutes at 70° C. By working up in the usual manner there is obtained a crude product which on recrystallization from methylene chloride+ether yields the pure 19:6β - lactone of 3β:20β - diacetoxy - 5α - chloro - 6β-hydroxy-5α-pregnane-19-acid melting at 189 to 190° C.

In an analogous manner there is obtained from the 18:20 - lactone of 3β - acetoxy - 5α - chloro - 6β:19 - oxido-20β-hydroxy-5α-pregnane-18-acid described in Example 13 of our copending application Ser. No. 222,168, filed September 7, 1962, in addition to acid reaction products, the 18:20; 19:6β - dilactone of 3β - acetoxy-5α - chloro - 6β:20β - dihydroxy - 5α - pregnane - 18:19 - diacid.

Example 2

(a) A suspension of 110 grams of lead tetraacetate and 50 grams of dry calcium carbonate in 4.5 liters of cyclohexane is stirred for about 40 minutes at the boil. 25 grams of 3β - acetoxy - 5α - chloro - 6β - hydroxy - 20-oxo-pregnane and 32 grams of iodine are then added and the solution is kept at the boil while being irradiated with a 1000 watt lamp and stirred until the color of iodine has completely disappeared (about 30 to 90 minutes). The whole is then cooled, the undissolved salts are filtered off and the filter residue is rinsed with cyclohexane. The filtrate is washed with dilute sodium thiosulfate solution and with water, dried and evaporated in a water-jet vacuum. Crystallization of the crude product from ether yields 19.2 grams of pure 3β-acetoxy-5α - chloro - 6β:19 - oxido - 20 - oxo - pregnane melting at 150 to 153° C. From the mother liquor another 3.3 grams of a slightly less pure substance can be isolated. Optical rotation of the pure compound $[\alpha]_D = +65°$ (in chloroform). Its infra-red spectrum contains bands, inter alia, at 5.78, 5.88, 6.70, 8.13, 9.12, 9.66, 10.60, 10.86 and 11.75μ.

In an analogous manner there are obtained

From 3:17α - diacetoxy - 5α - chloro - 6β - hydroxy - 20 - oxo - pregnane the 3β:17α - diacetoxy - 5α - chloro - 6β:19 - oxido - 20 - oxo - pregnane melting at 187 to 187.5° C., From 3β - acetoxy - 5α - chloro - 6β - hydroxy - 17α - valerianyloxy - 20 - oxo - pregnane the 3β - acetoxy - 5α - chloro - 6β:19 - oxido - 17α - valerianyloxy - 20 - oxo-pregnane, and From 3β - acetoxy - 5α - chloro - 6β - hydroxy - 17α - methoxy - 20 - oxo - pregnane the 3β - acetoxy - 5α - chloro - 6β:19 - oxido - 17α - methoxy - 20 - oxo - pregnane.

The chlorohydrin used as starting material is prepared in the following manner: A solution of 150 grams of pregnenolone acetate in 5 liters of ether is treated with 150 grams of chlorinated lime (containing 30% of active chlorine) and 8.2 liters of water and the reaction mixture is vigorously stirred. After 5 minutes 105 cc. of glacial acetic acid and after another 25 minutes 500 cc. of potassium iodide solution of 10% strength are added. Finally, the aqueous phase is separated, and the ethereal solution is washed with sodium thiosulfate solution of 10% strength, dilute sodium bicarbonate solution and with water, dried and evaporated in a water-jet vacuum. The residue is treated with 800 cc. of acetone and kept overnight at 0° C., to yield 47.5 grams, and from the mother liquor another 58 grams, of 3β-acetoxy-5α-chloro-6β-hydroxy-20-oxo-pregnane which melts at 196 to 197° C. after recrystallization from acetone. Optical rotation $[\alpha]_D = +25.5°$ (in chloroform). The infra-red spectrum of the compound displays bands, inter alia, at 2.75, 5.78, 5.88, 8.12, 8.68, 9.68 and 9.72μ.

In an analogous manner addition of hypochlorous acid on to the 17α-acetoxy-pregnenolone acetate yields 3β:17α-diacetoxy - 5α - chloro - 6β - hydroxy - 20 - oxo - pregnane.

(b) 10.0 grams of 3β - acetoxy - 5α - chloro - 6β:19 - oxido-20-oxo-pregnane in 180 cc. of acetic anhydride are treated with 4.0 grams of para-toluenesulfonic acid and heated in a bath maintained at 140 to 150° C. for 4 hours under a pressure of 50 to 60 mm. Hg, during which 90 cc. of solvent are distilled off. The reaction mixture is cooled, poured over ice and water and extracted with a 3:1-mixture of ether and methylene chloride. The extracts are washed with sodium bicarbonate solution and with water, dried and evaporated. The residue (10.40 grams) is dissolved in benzene and the solution is filtered through 100 grams of alumina. The eluates yield 10.1 grams of crude product which still contains about 15% of starting material. Crystallization from methylene chloride+ether+petroleum ether yields pure $\Delta^{17(20)}$ - 3β:20 - diacetoxy - 5α - chloro - 6β:19 - oxido-pregnene melting at 171 to 172° C. Optical rotation $[\alpha]_D = +18.4°$ (in chloroform). The infra-red spectrum of the compound contains bands, inter alia, at 5.76, 6.70, 7.30, 8.16, 9.13, 10.60 and 10.87 μ.

A solution of 10.1 grams of crude $\Delta^{17(20)}$-3β:20-diacetoxy-5α-chloro-6β:19-oxido-pregnene in 250 cc. of benzene is treated with 240 cc. of an ethereal solution of perbenzoic acid (containing 2 molecular equivalents of per-acid calculated on the enol acetate) and kept for 5 hours at room temperature, after which time 70.2% of the amount of per-acid calculated for complete oxidation has been consumed. The reaction mixture is diluted with ice water, extracted with ether and the extracts are washed with water, sodium bicarbonate solution and water. The dried ethereal solution yields 9.90 grams of crude epoxide. After recrystallization from methylene chloride+ether pure 3β:20-diacetoxy-5α-chloro-6β:19;17α:20-bisoxido-pregnane melts at 192 to 194° C. Optical rotation $[\alpha]_D = +14.4°$ (in chloroform). The infra-red spectrum of the compound contains bands, inter alia, at 5.76, 6.70, 7.30, 8.13, 8.58, 9.67, 10.66 and 10.81μ.

A mixture of 10.0 grams of crude 3β:20-diacetoxy-5α-chloro-6β:19;17α:20-bisoxido-pregnane, 800 cc. of alcohol and 45 cc. of aqueous sodium hydroxide solution of 2.4% strength is kept for one hour at room temperature, treated with 500 cc. of water and concentrated in a water-jet vacuum to half the volume. The concentrate is heated for 3 hours at 60° C., and the precipitate is filtered off, thoroughly washed with water and the filter residue is dried, to yield 9.85 grams of crude product which after crystallization from methylene chloride+methanol yields 3.90 grams of pure 3β:17α-dihydroxy-5α-chloro-6β:19-oxido-20-oxo-pregnane melting at 251 to 253°. Optical rotation $[\alpha]_D = +22.4°$ (in chloroform+alcohol). From the mother liquor another compound separates out which melts at 251 to 253° C.; it is probably a rearrangement product of the above diol.

A mixture of 200 mg. of 3β:17α-dihydroxy-5α-chloro-6β:19-oxido-20-oxo-pregnane, 1.0 cc. of acetic anhydride and 1.0 cc. of pyridine is stirred for 14 hours, with the starting material slowly passing into solution. The solution is then poured into ice water and extracted with a mixture of ether and methylene chloride. The extracts are washed with water, hydrochloric acid, sodium bicarbonate solution and with water and dried, to yield 210 mg. of crude product which is crystallized from ether+petroleum ether to yield 185 mg. of pure 3β-acetoxy-5α - chloro - 6β:19 - oxido - 17α - hydroxy - 20 - oxo-pregnane melting at 166 to 167° C. Occasionally, the compound is obtained in a crystalline modification melting up to about 175° C. Optical rotation $[\alpha]_D = -2.1°$ (in chloroform). Its infra-red spectrum contains bands, inter alia, at 2.74, 2.82, 5.76, 5.85, 6.69, 7.30, 8.10, 9.65 and 10.86μ.

A mixture of 100 mg. of 3β:17α-dihydroxy-5α-chloro-6β:19-oxido-20-oxo-pregnane, 1.0 cc. of acetic anhydride and 100 mg. of para-toluene sulfonic acid is stirred for 2½ hours at 40° C., then poured into a mixture of 50 cc. of ice water and 0.5 cc. of pyridine, diluted with ether after 10 minutes, and the extracts are washed with sodium bicarbonate solution and with water. Recrystallization of the evaporation residue (106 mg.) from ether+petroleum ether yields 98 mg. of pure 3β:17α-diacetoxy-5α-chloro-6β:19-oxido-20-oxo-pregnane melting at 187 to 187.5° C. Optical rotation $[\alpha]_D = -6.2°$ (in chloroform). The infra-red spectrum of the compound contains bands, inter alia, at 5.77, 6.68, 7.79, 8.10, 9.65, 10.39 and 10.85μ.

Example 3

2.5 grams of 3β:17α-diacetoxy-5α-chloro-6β:19-oxido-20-oxo-pregnane are dissolved in 50 cc. of glacial acetic acid. The solution is heated to 70° C., and a solution of 3.75 grams of chromium trioxide, in 3.75 cc. of water and 30 cc. of glacial acetic acid is added in the course of about 4 minutes, and the whole is stirred for 30 minutes at 70° C. The reaction mixture is cooled, poured on to water and the precipitated white crystals filtered off with suction. There are obtained 2.48 grams of the crude 19:6β-lactone of 3β:17α-diacetoxy-5α-chloro-6β-hydroxy-20-oxo-pregnane-19-acid melting at 215–219° C. The pure compound recrystallized from a mixture of methylene chloride and ether melts at 235–237° C. Infra-red bands inter alia at 5.64μ (γ lactone); 5.80μ (acetate+20 ketone); 8.08μ; 9.05μ; 9.16μ; 9.25μ; 9.60μ; 10.34μ; 10.78μ and 12.07μ.

1.7 grams of the 19:6β-lactone of 3β:17α-diacetoxy-5α-chloro-6β-hydroxy-20-oxo-pregnane-19-acid are stirred in 104 cc. of methanol for 45 minutes in a bath heated to 70° C. after adding 340 mg. of sodium bicarbonate and 3.1 cc. of water. The reaction mixture is cooled, 500 cc. of water are added and extraction is carried out with ether. The extracts are washed with water and dried to yield 1.57 grams of crude 19:6β-lactone of 3β:6β-dihydroxy - 5α - chloro-17α-acetoxy-20-oxo-pregnane-19-acid which after being recrystallized from a mixture of methylene chloride and ether, melts at 246–248° C.

Example 4

A suspension of 17.5 grams of lead tetraacetate and 8.0 grams of calcium carbonate in 800 cc. of cyclohexane is first heated for 30 minutes to boiling point while stirring. 4.0 grams of 3β:11α:20β-triacetoxy-5α-chloro-6β-hydroxypregnane and 5.13 grams of iodine are then added and the mixture is heated for another hour to boiling point while being stirred and exposed to a 500 watt lamp, the color of the iodine slowly disappearing. After the reaction time has expired, the mixture is cooled, the insoluble salts are separated by filtration and the filtrate is washed with 10% sodium thiosulfate solution and with water. The aqueous solutions are extracted once more with ether and the combined organic solutions are dried and evaporated in a water-jet vacuum. The partly crystallizing crude product obtained (6.146 grams) is dissolved in 100 cc. of glacial acetic acid to reduce the starting material contained therein and the soltuion is stirred for 2 hours at 80° C. after adding 10 grams of zinc dust. The undissolved zinc is then filtered off and the filtrate is diluted with methylene chloride and washed with sodium bicarbonate solution and with water. 4.253 grams of crude product are obtained from the dried organic solutions after evaporation. By crystallization from ether, 923 mg. of 3β:11α:20β-triacetoxy-5α-chloro-6β:19-oxidopregnane having a melting point of 228–230° C. can be separated therefrom (conversion from 185° C.); $[α]_D = -6.2°$ (in chloroform); IR bands inter alia at 5.77μ and 8.09μ (acetates), 9.63μ; 9.75μ and 10.84μ.

The mother liquor is evaporated to dryness and chromatographed on 100 grams of aluminum oxide. With 900 cc. of hexane, 900 cc. of hexane-benzene mixture (4:1) only 81 mg. of oily by-products are eluted. From the fractions eluted with another 300 cc. of benzene-hexane mixture (2:1) there are obtained by crystallization from aqueous methanol 119 mg. of Δ⁵-3β:11α:20β-triacetoxypregnene, which has been produced by zinc reduction of the 5α-chloro-6β-hydroxy compound. The following 300 cc. of benzene-hexane mixture (2:1) and 300 cc. of benzene contain mixtures of substances, while the evaporation residues of the fractions eluted with 900 cc. of benzene and 600 cc. of benzene-ethyl acetate mixture (9:1), when crystallized from ether, yield a further 411 mg. of the above-described 3β:11α:20β-triacetoxy-5α-chloro-6β:19-oxido-pregnane. Finally from the fractions eluted with benzene-ethyl acetate mixture (1:1), with ethyl acetate and with methanol, 718 mg. of 3β:11α:20β-triacetoxy - 5α - chloro-6β:19-oxido-19-hydroxypregnane having a melting point of 232–233° C. are obtained by crystallization from methylene chloride-ether;

$$[α]_D^{25} = -13.2°$$

(in chloroform-alcohol in a ratio 1:1). IR bands inter alia at 2.79μ and 2.93μ (OH), 5.78μ and 8.12μ (acetates); 9.30μ; 9.70μ, 10.55μ and 10.91μ.

The 3β:11α:20β - triacetoxy - 5α - chloro-6β-hydroxypregnane employed as starting material is prepared as follows: 18.71 grams of Δ⁴-3-oxo-11α-acetoxy-20β-hydroxypregnene are heated to boiling point in 100 cc. of isopropenyl acetate after adding 0.1 cc. of concentrated sulfuric acid. After one hour, 10 cc. of solvent are distilled off, boiling is then continued for another hour under reflux and the solution is then evaporated in a water-jet vacuum after adding 500 mg. of anhydrous sodium acetate. The residue is taken up in methylene chloride and the solution is washed with water, dried and once more evaporated. From the crude product (21 grams), 13.66 grams of pure Δ³·⁵-3:11α:20β-triacetoxy-pregnatriene having a melting point of 145–150° C. are obtained by crystallization from ether; $[α]_D^{25} = -144.3°$ (in chloroform); UV maximum at 235 mμ (ε=19,500); IR bands inter alia at 5.77μ (with shoulder at 5.68μ) and 8.16μ (acetates), 9.76μ; 10.40μ and 10.83μ.

12.0 grams of this enol acetate are dissolved in 900 cc. of alcohol. A solution of 6.0 grams of sodium borohydride in 120 cc. of 70% aqueous alcohol is added to the solution, which has been cooled to +5° C., and the reaction mixture is allowed to stand for 3 days at 0° C. 10 cc. of glacial acetic acid are then dropped in while stirring and the reaction mixture is concentrated in a water-jet vacuum to about 100 cc., diluted with methylene chloride and washed with water. 11.52 grams of a residue are obtained from the dried methylene chloride solution after evaporation and from this 9.78 grams of pure Δ⁵-3β-hydroxy-11α:20β-diacetoxypregnene can be isolated by crystallization from ether. The compound, after being dissolved once more in methanol and allowed to crystallize, melts at 162–165° C. $[α]_D^{25} = -69.6°$ (in chloroform); IR bands inter alia at 2.74μ (OH), 5.78μ and 8.09μ (acetates); 9.76μ and 10.45μ.

9.78 grams of this compound are allowed to stand overnight at room temperature in 50 cc. of pyridine and 30 cc. of acetic anhydride. The reaction mixture is then evaporated to dryness in a water-jet vacuum and the residue is crystallized from aqueous methanol. 10.1 grams of Δ⁵-3β:11α:20β-triacetoxypregnene having a melting point of 141–143° C. are obtained; $[α]_D^{25} = -59.4°$ (in chloroform). IR bands inter alia at 5.78μ and 8.09μ (acetates), 9.76μ; 10.44μ and 10.93μ.

3.0 grams of Δ⁵-3β:11α:20β-triacetoxypregnene are dissolved in 180 cc. of ether. After adding 180 cc. of water and 3.0 grams of chlorinated lime, the reaction solution is thoroughly stirred and 2.1 cc. of glacial acetic acid are then added. The two phases are then well mixed for 40 minutes with vibromixer, 50 cc. of 2% sodium thiosulfate solution and 50 cc. of 5% potassium iodide solution are then added, separation is carried out and the organic solution is washed several times with water. 1.78 grams of 3β:11α:20β - triacetoxy-5α-chloro-6β-hydroxypregnane having a melting point of 225–227° C. are obtained from the evaporation residue (3.417 grams) by crystallization from ether; $[α]_D^{25} = -43.2°$ (in chloroform); IR bands inter alia at 2.74μ (OH); 5.78μ and 8.09μ (acetates); 9.30μ; 9.56μ; 9.75μ and 10.45μ.

Example 5

A solution, cooled to 0° C., of 100 mg. of 3β:11α:20β-triacetoxy - 5α-chloro-6β:19-oxido-19-hydroxypregnane in 10 cc. of acetone is stirred for 10 minutes at 0° C. after adding 0.2 cc. of a 26.6% solution of chromium trioxide in sulfuric acid of 42% strength. 500 mg. of crystalline sodium acetate are then added and the solution is diluted with methylene chloride and washed several times with water. 95 mg. of crystallized lactone of 3β:11α:20β-triacetoxy - 5α - chloro-6β-hydroxypregnane-19-acid, having a melting point of 246–247° C., are obtained from the dried methylene chloride solution; $[\alpha]_D^{25} = -50.1°$ (in chloroform); IR bands inter alia at 5.58μ (lactone), 5.75μ and 8.09μ (acetates); 9.26μ; 9.65μ and 10.77μ.

What is claimed is:
1. 3:19-oxygenated 5α-halogen-6β:19-oxido-pregnanes of the formula

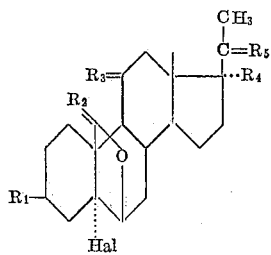

wherein
  $R_1$ stands for a member selected from the group consisting of hydroxy and acyloxy,
  $R_2$ stands for a member selected from the group consisting of oxo and hydrogen together with hydroxy,
  $R_3$ stands for a member selected from the group consisting of oxo, hydrogen, hydrogen together with hydroxy and hydrogen together with acyloxy,
  $R_4$ stands for a member selected from the group consisting of hydrogen, hydroxy and acyloxy,
  $R_5$ stands for a member selected from the group consisting of oxo, hydrogen together with hydroxy and hydrogen together with acyloxy, and
  Hal stands for a halogen atom selected from the group consisting of chlorine and bromine, said acyloxy groups being derived from carboxylic acids having up to 15 carbon atoms.

2. The 19:6β-lactone of 3β:20β-diacetoxy-5α-chloro-6-β-hydroxy-pregnane-19-oic acid.
3. The 19:6β-lactone of 3β:17α-diacetoxy-5α-chloro-6β-hydroxy-20-oxo-pregnane-19-oic acid.
4. The 19:6β-lactone of 3β:6β-dihydroxy-5α-chloro-17α-acetoxy-20-oxo-pregnane-19-oic acid.
5. 3β:11α:20β-triacetoxy - 5α - chloro-6β:19-oxido-19-hydroxy-pregnane.
6. The 19:6β - lactone of 3β:11α:20β - triacetoxy-5α-chloro-6β-hydroxy-pregnane-19-oic acid.

References Cited in the file of this patent
UNITED STATES PATENTS
3,033,862    Ringold et al. _____ May 8, 1962